United States Patent
Ogle et al.

(10) Patent No.: US 10,233,737 B2
(45) Date of Patent: Mar. 19, 2019

(54) ON-THE-FLY PRODUCTION OF MATERIALS FOR TREATMENT OF A WELL

(71) Applicant: Halliburton Energy Services, Inc., Houston, TX (US)

(72) Inventors: James W. Ogle, Houston, TX (US); Philip D. Nguyen, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 54 days.

(21) Appl. No.: 15/318,954

(22) PCT Filed: Jul. 17, 2014

(86) PCT No.: PCT/US2014/046949
§ 371 (c)(1),
(2) Date: Dec. 14, 2016

(87) PCT Pub. No.: WO2016/010539
PCT Pub. Date: Jan. 21, 2016

(65) Prior Publication Data
US 2017/0130571 A1 May 11, 2017

(51) Int. Cl.
*E21B 43/267* (2006.01)
*C09K 8/80* (2006.01)
(Continued)

(52) U.S. Cl.
CPC ............ *E21B 43/267* (2013.01); *C04B 16/08* (2013.01); *C04B 18/022* (2013.01);
(Continued)

(58) Field of Classification Search
None
See application file for complete search history.

(56) References Cited

U.S. PATENT DOCUMENTS 7,524,448 B2   4/2009 Rector
7,541,318 B2   6/2009 Weaver et al.
(Continued)

FOREIGN PATENT DOCUMENTS

EP   2163723 A1   3/2010

OTHER PUBLICATIONS

International Search Report and Written Opinion dated Apr. 13, 2015 for PCT Application PCT/US2014/046949 filed on Jul. 17, 2014. 17 pages.

*Primary Examiner* — Anuradha Ahuja
(74) *Attorney, Agent, or Firm* — Chamberlain Hrdlicka

(57) ABSTRACT

A method of manufacturing particulate material. The method can include manufacturing particulate material during an operation at a well, injecting the particulate material into the well during the manufacturing, and changing a dimension of the particulate material during the injecting. Another method of manufacturing particulate material can include manufacturing particulate material during an operation at a well, injecting the particulate material and a proppant into the well during the manufacturing, and then the particulate material degrading in the well. Another method of manufacturing particulate material can include manufacturing particulate material during an operation at a well, fixing a shape of the particulate material by cooling the particulate material, and then injecting the particulate material into the well. A particulate material production and injection system for use with a well can include an extruder, and a pump connected between the extruder and the well that pumps particulate material into the well.

20 Claims, 4 Drawing Sheets

(51) Int. Cl.
  *C04B 24/26* (2006.01)
  *C04B 24/28* (2006.01)
  *C04B 16/08* (2006.01)
  *C04B 18/02* (2006.01)
  *C09K 8/467* (2006.01)
  *C09K 8/03* (2006.01)
  *C04B 26/18* (2006.01)
  *E21B 43/26* (2006.01)
  *E21B 43/04* (2006.01)

(52) U.S. Cl.
  CPC ........ *C04B 24/2676* (2013.01); *C04B 24/283* (2013.01); *C04B 24/285* (2013.01); *C04B 26/18* (2013.01); *C09K 8/03* (2013.01); *C09K 8/467* (2013.01); *C09K 8/80* (2013.01); *E21B 43/26* (2013.01); *E21B 43/04* (2013.01)

(56) References Cited

U.S. PATENT DOCUMENTS

| | | | |
|---|---|---|---|
| 7,968,613 B2 | 6/2011 | Glew et al. | |
| 8,496,861 B2 | 7/2013 | Kaufmann et al. | |
| 8,585,388 B2 | 11/2013 | Fare' | |
| 8,628,704 B2 | 1/2014 | Pop-Iliev et al. | |
| 2003/0060374 A1* | 3/2003 | Cooke, Jr. | C09K 8/62 507/200 |
| 2004/0043906 A1* | 3/2004 | Heath | C09K 8/536 507/200 |
| 2005/0113262 A1 | 5/2005 | Ravi et al. | |
| 2005/0267001 A1* | 12/2005 | Weaver | C09K 8/62 507/219 |
| 2005/0272611 A1* | 12/2005 | Lord | C09K 8/80 507/200 |
| 2005/0284631 A1* | 12/2005 | Nguyen | C09K 8/62 166/278 |
| 2008/0217010 A1* | 9/2008 | Blackburn | C09K 8/62 166/280.2 |
| 2008/0264641 A1 | 10/2008 | Slabaugh et al. | |
| 2011/0024129 A1* | 2/2011 | Turakhia | C09K 8/805 166/369 |
| 2011/0136943 A1* | 6/2011 | James | C04B 18/022 524/5 |
| 2012/0272838 A1 | 11/2012 | Leblanc et al. | |
| 2014/0048262 A1* | 2/2014 | Worley | E21B 43/267 166/280.1 |

\* cited by examiner

ON-THE-FLY PRODUCTION OF MATERIALS FOR TREATMENT OF A WELL

TECHNICAL FIELD

This disclosure relates generally to equipment utilized and operations performed in conjunction with a subterranean well and, in one example described below, more particularly provides for on-the-fly production of materials for use in treatment of a well.

BACKGROUND

Materials for use in well treatment operations are typically manufactured at dedicated facilities remote from well-sites where the materials will ultimately be used. Such materials can include proppants, diverters or other types of materials. Therefore, it will be appreciated that improvements are continually needed in the art of producing materials for use in well treatment operations.

DETAILED DESCRIPTION

Figure 1:
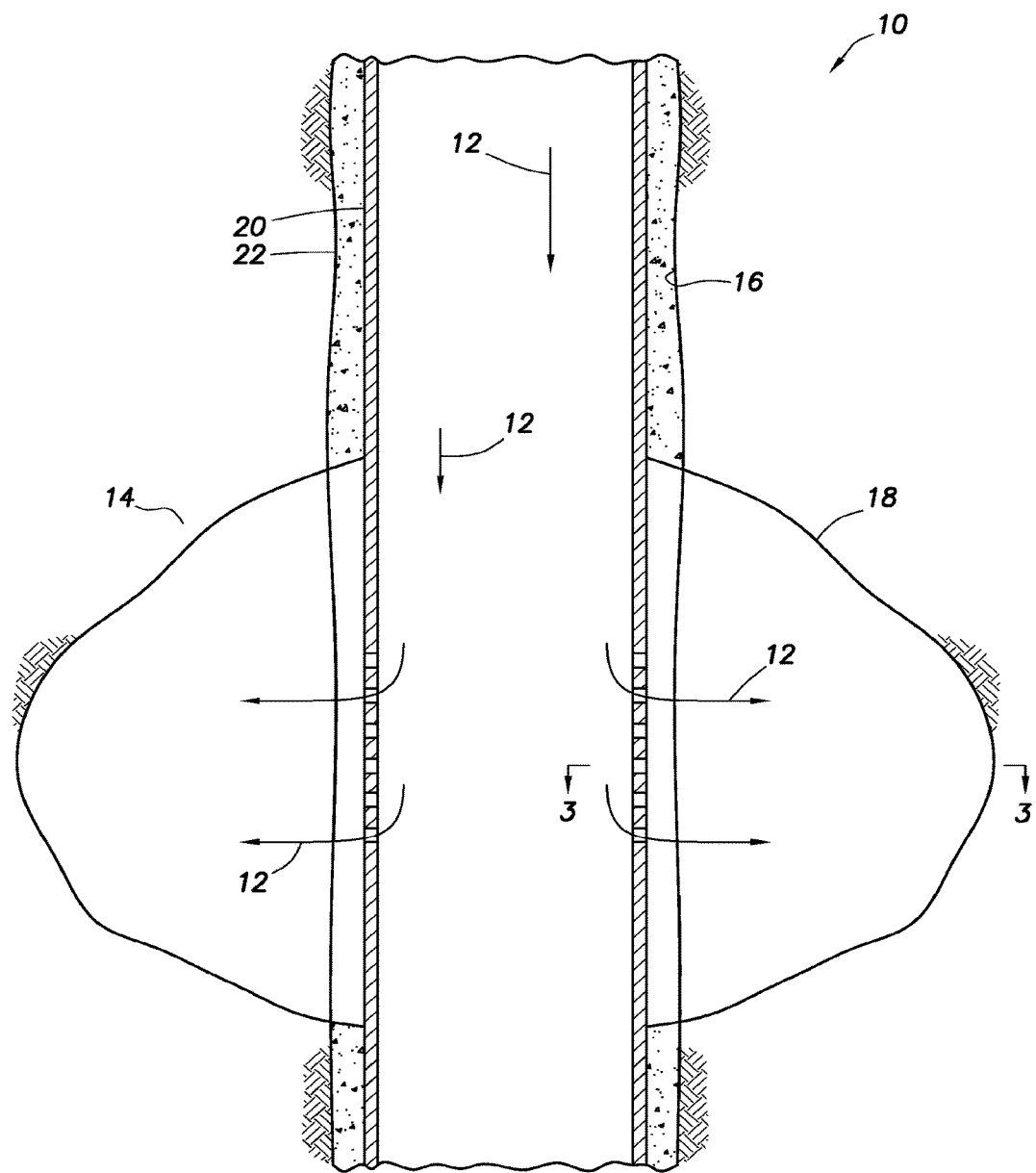
FIG. 1 is a representative partially cross-sectional view of a well system and associated method which can embody principles of this disclosure.

Representatively illustrated in FIG. 1 is a well 10 and associated method which can embody principles of this disclosure. However, it should be clearly understood that the well 10 and method are merely one example of an application of the principles of this disclosure in practice, and a wide variety of other examples are possible. Therefore, the scope of this disclosure is not limited at all to the details of the well 10 and method described herein and/or depicted in the drawings.

In the FIG. 1 example, a slurry 12 is injected at elevated pressure into an earth formation 14 penetrated by a wellbore 16, thereby forming a fracture 18 in the formation. The wellbore 16 depicted in FIG. 1 is lined with casing 20 and cement 22, and is generally vertical, but in other examples the formation 14 may be fractured from a generally horizontal or inclined portion of a wellbore, which may be uncased or open hole where the fracture is formed, and multiple fractures may be formed at one or multiple locations. Thus, the scope of this disclosure is not limited to any particular wellbore orientation, use of casing or liner, or fracture number or location.

Furthermore, it is not necessary for the principles of this disclosure to be applied in a fracturing operation. For example, the slurry 12 could be injected into the formation 14 after the fracture 18 has already been formed. As another example, the slurry 12 could be used to divert or prevent fluid from flowing into the fracture 18. As yet another example, the slurry 12 could be used in completion operations, such as in a gravel packing operation, to prevent fluid from flowing into a formation while gravel is being placed about a well screen (not shown). Thus, the scope of this disclosure is not limited to use of the slurry 12 in association with a fracture or in any particular type of well operation.

The slurry 12 in the FIG. 1 example differs from prior slurries in that it includes a particulate material (not shown in FIG. 1, see FIGS. 3 & 5) that is manufactured on site, and is then injected into the well 10. In this manner, the particulate material can be tailored for specific well and formation conditions, and certain parameters of the particulate material (such as, dimensions, density, composition, wettability, configuration, etc.) can be changed as needed or desired to achieve optimal results.

For example, it may be desirable for a dimension of the particulate material to be relatively small when the fracture 18 is initiated, and then for the dimension of the particulate material to increase as a width of the fracture increases. As another example, it may be desirable for a density of the particulate material to decrease as a fracturing operation proceeds, in order to achieve enhanced vertical distribution of the particulate material along the wellbore 16. Thus, the scope of this disclosure is not limited to any particular reason for, or result of, changing a parameter of the particulate material during a well operation.

Figure 2:
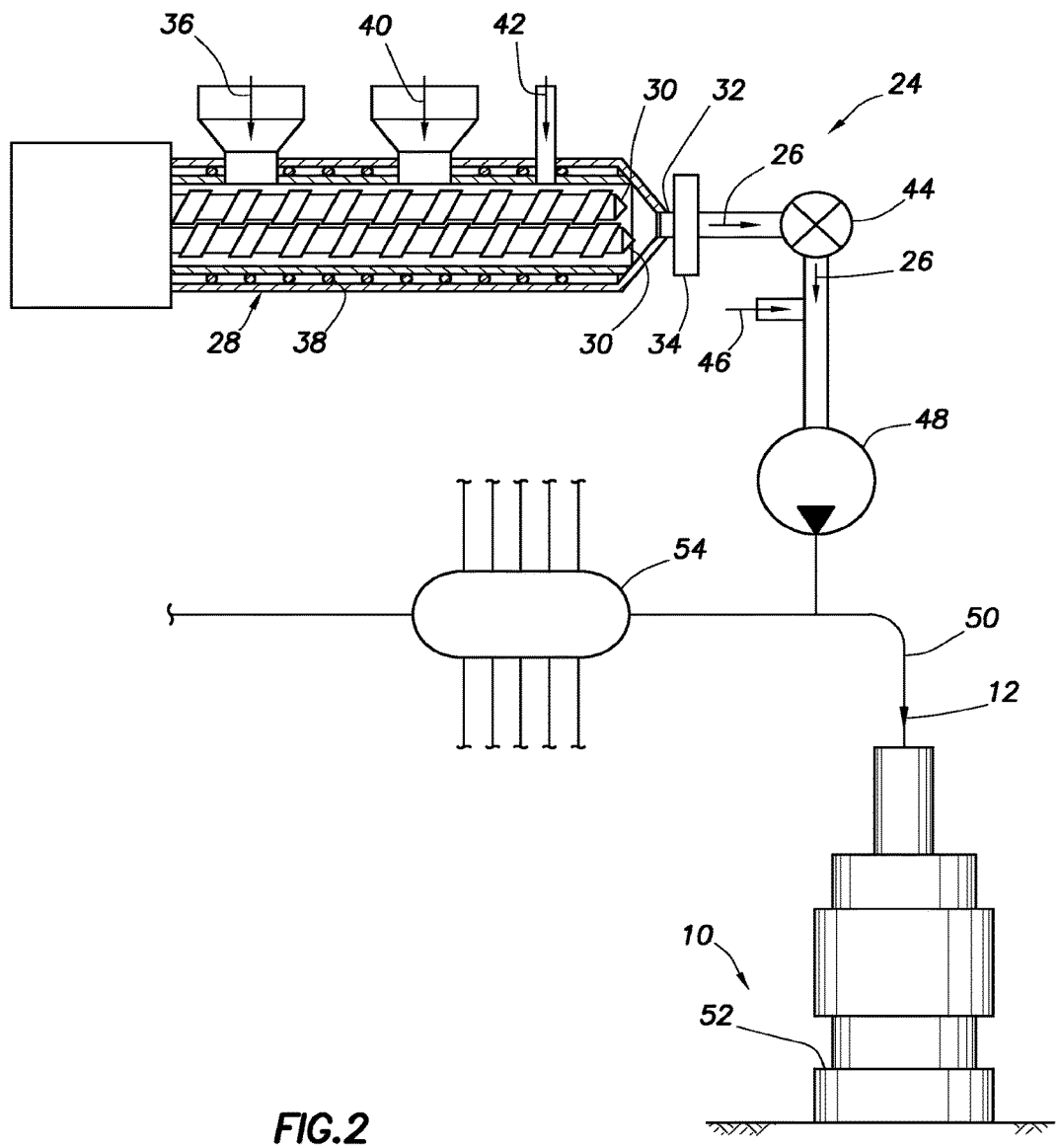
FIG. 2 is a representative schematic view of a technique for producing particulate material for use in the well system.

Referring additionally now to FIG. 2, a schematic view of a particulate material production and injection system 24 that may be used with the well 10 of FIG. 1 is representatively illustrated. Of course, the system 24 may be used with other wells and for other purposes, in keeping with the principles of this disclosure.

In the FIG. 2 example, particulate material 26 is manufactured by use of an extruder 28. The extruder 28 depicted in FIG. 2 is of the type known to those skilled in the art as a twin screw extruder. However, the scope of this disclosure is not limited to use of any particular type of extruder.

The extruder 28 includes screws 30 that perform a variety of functions, such as, conveying material through the extruder, mixing materials in the extruder, forcing material through a die 32 at an end of the extruder, etc. In some examples, a gap between the screws 30 can be varied to thereby change a dimension and/or mixture of the material 26 that is extruded from the extruder 28.

In addition to varying the gap between the screws 30, other ways of changing a dimension of the extruded particulate material 26 include (but are not limited to) varying a size or shape of an opening through the die 32, varying a feed rate of material into the extruder 28, varying a rotational speed of the screws 30, varying a rate at which the material exiting the extruder is cut by a blade of a slicer 34, etc. Thus, the scope of this disclosure is not limited to any particular technique for changing a dimension of the particulate material 26.

The particulate material 26 can comprise only a single material, or it may comprise a combination of materials. In the FIG. 2 example, a polymer material 36 is introduced into the extruder 28, and is heated by heater coils 38. A filler material 40 can be combined with the heated material 36 in the extruder 28. Additionally, a gas 42 can be mixed with the materials 36, 40 in the extruder 28, in order to change a density of the particulate material 26.

The filler material 40 can be a material selected to add volume to the extruded particulate material 26. In some examples, the filler material 40 can be degradable, can comprise a surfactant, solvent, solid particulate, etc.

However, it should be clearly understood that the materials 36, 40 and gas 42 are merely examples of a wide variety of different types of materials that could be combined to produce the particulate material 26. Any number of different materials could be combined in any order (or simultaneously) to produce the particulate material 26.

In some examples, the material 36 could be any polyesters, any nylons, polyethylene (including high density polyethylene), high density polystyrene, polylactic acid, polyglycolic acid, copolymers of these, etc. In some examples, the material 36 can be degradable (for example, dissolvable, dispersible, etc.) in response to contact with a specific degrading agent (such as, an acid, a solvent, water, an oxidizer, etc.) in the well 10, in response to passage of time, in response to exposure to elevated temperatures, etc.

The materials 36, 40 can be in solid, liquid or powder form when they are introduced into the extruder 28. The scope of this disclosure is not limited to use of any particular type or form of material introduced into the extruder 28 to produce the particulate material 26.

The system 24 allows for manipulation of material 26 properties on-the-fly (such as, while the material 26 is being injected into the well 10). The extruder 28 can be used to generate external and internal phase differences in various shapes. Polymer materials of a specific composition can be compounded further downstream in the extruder 28 with materials of different crystallinities, different properties, or with different wettability from core materials.

For example, a polyester material with a specific shape, but with different wettability from a native polyester, could be generated by mixing surfactants into the material 26 near the end of the extruder 28. Other substances that can be combined with the material 26 include solvents, other polymers, mineral materials (such as, anti-caking components, for example, to provide a non-wet surface), etc.

Materials with different degradation rates can be generated by compounding polyesters with varying crystallinities, and coating-like processes can be performed by feeding different types of polyesters into the extruder 28 at different points. Densities can be controlled by feeding gas 42 of various compositions and amounts into the extruder 28, as well. Coatings within coatings of materials, different wettabilities for different fluid interactions, and density for different suspension, carrying and distribution purposes can all be controlled and varied at a wellsite.

In the FIG. 2 example, the material 26 exits the extruder 28 and passes through the slicer 34. A valve 44 (such as, a butterfly valve) is then used to control introduction of the particulate material 26 into an injection stream.

After the material 26 passes through the valve 44 it is contacted by a stream of relatively cold or surface temperature water 46. This cools the material 26 and fixes its dimensions and shape, prior to the material being injected into the well 10.

A pump 48 then forces the material 26 (and water 46) into an injection line 50 connected to a wellhead 52. The material 26, thus, becomes part of the slurry 12 injected into the well 10.

In the FIG. 2 example, the material 26 is pumped into the injection line 50 downstream of an apparatus known to those skilled in the art as a "missile" 54. The missile 54 is a manifold allowing multiple different fluids, materials, gels, etc. (such as, proppants, diverters, acids, surfactants, etc.) to be combined for flow into the well 10 via the injection line 50.

In other examples, the material 26 could be pumped into the missile 54, or the material 26 could be pumped into a line upstream of the missile. Thus, the scope of this disclosure is not limited to any particular location for combining the material 26 into the slurry 12.

Figure 3:
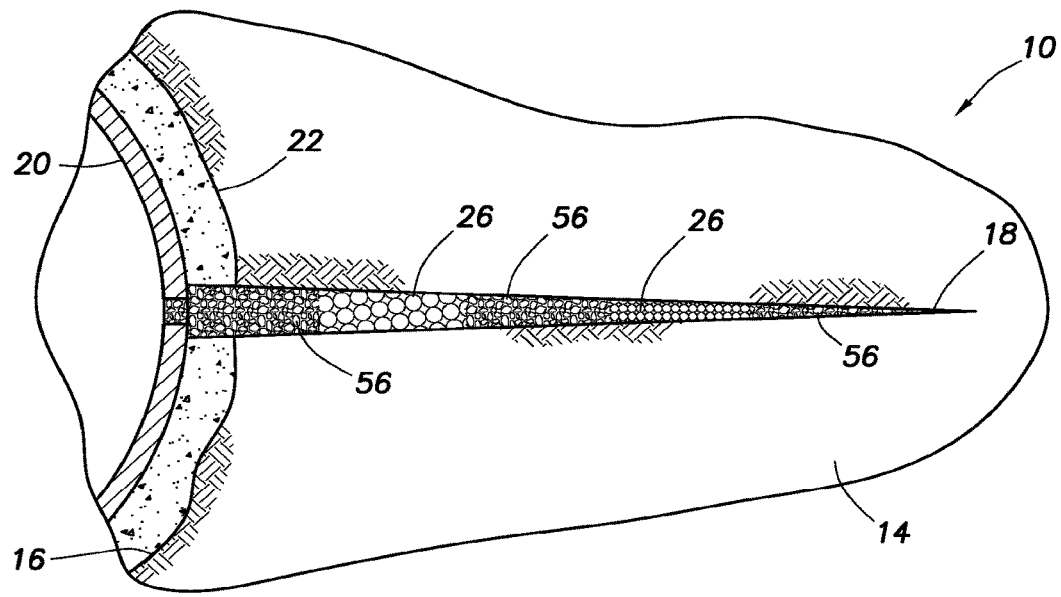
FIG. 3 is a representative cross-sectional view of a fracture in an earth formation, the particulate material and a proppant having been alternately placed in the fracture.

Referring additionally now to FIG. 3, an enlarged scale cross-sectional view of a portion of the well 10, taken along line 3-3 of FIG. 1, is representatively illustrated. In this view, one example of a manner in which the material 26 can be used in a fracturing operation is depicted.

In the FIG. 3 example, the material 26 is intermittently added to the slurry 12. Proppant 56 is added to the slurry 12 when the material 26 is not added to the slurry. Thus, the material 26 and proppant 56 are added alternately to the slurry 12 (although, at times, neither of the material and proppant may be added to the slurry).

As depicted in FIG. 3, a result of this technique can be that some portions of the fracture 18 have mostly the material 26 therein, and some portions of the fracture have mostly the proppant 56 therein. If the material 26 comprises a diverting material, then this technique can cause different portions of the formation 14 to fracture (e.g., due to the diverting material temporarily closing off already-fractured portions of the formation), thereby enhancing the fracturing of the formation. Note that, in the FIG. 3 example, the material 26 first injected into the fracture 18 has smaller dimensions as compared to the material later injected into the fracture.

Although the fracture 18 is depicted in the drawings as being substantially straight and planar, in some circumstances fractures can have significant tortuosity, branching, etc. Another effect of the material 26 comprising a diverting material can be to cause the fracture 18 to extend in different directions and increase branching (e.g., due to the diverting material temporarily closing off portions of the fracture). In this manner, the fracture 18 can provide enhanced connectivity between the formation 14 and the wellbore 16.

Figure 4:
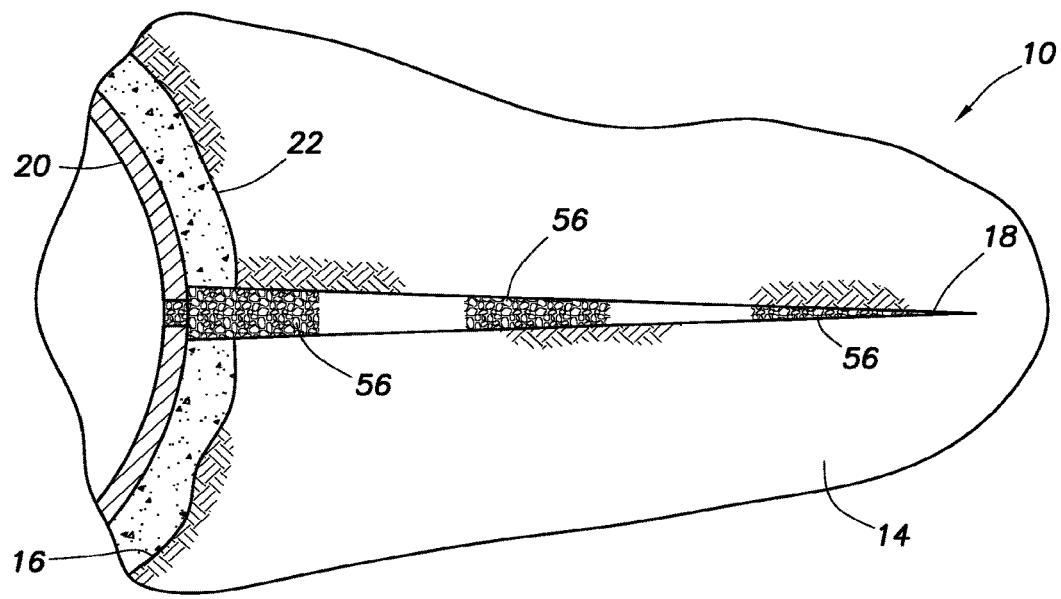
FIG. 4 is a representative cross-sectional view of the fracture of FIG. 3, after the particulate material has been degraded.

Referring additionally now to FIG. 4, the well 10 is representatively illustrated after the material 26 has been dissolved, dispersed or otherwise degraded. The proppant 56 remains in the fracture 18 to prop open the fracture, reduce production of formation fines, etc.

In this example, with the material 26 removed from the fracture 18, fluid communication between the formation 14 and the wellbore 16 is improved. However, in other examples, the material 26 may not comprise a diverting material or may not otherwise restrict fluid communication between the formation 14 and the wellbore 16. Furthermore, it is not necessary for the material 26 to be degraded after it is injected into the well 10. Thus, the scope of this disclosure is not limited to use of the material 26 as a diverter, or to use of the material 26 for any particular purpose in the well 10.

Figure 5:
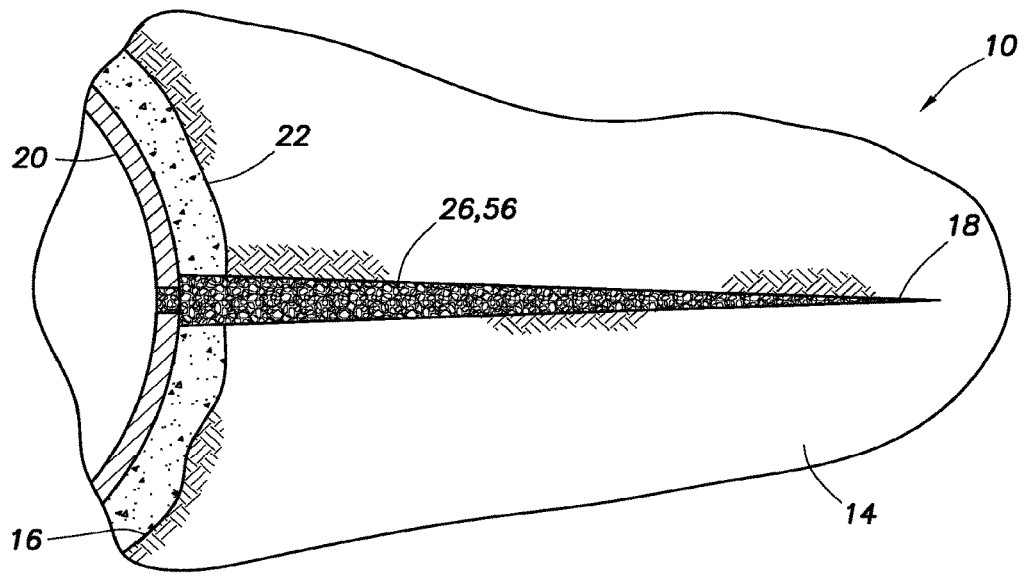
FIG. 5 is a representative cross-sectional view of the fracture, the particulate material and a proppant having been simultaneously placed in the fracture.

Referring additionally now to FIG. 5, another example of a manner in which the material 26 can be used in a fracturing operation is depicted. In this example, the material 26 and the proppant 56 are added at a same time to the slurry 12, so that they are injected into the well 10 simultaneously. As viewed in FIG. 5, the material 26 and the proppant 56 are mixed together in the fracture 18.

Figure 6:
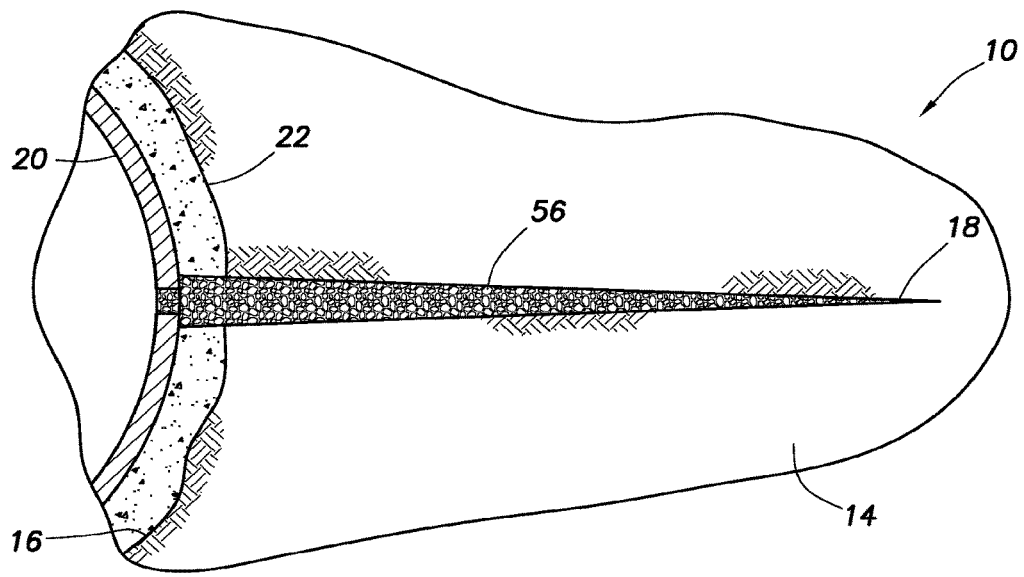
FIG. 6 is a representative cross-sectional view of the fracture of FIG. 5, after the particulate material has been degraded.

Referring additionally now to FIG. 6, the fracture 18 is depicted after the material 26 has been dissolved, dispersed or otherwise degraded. The proppant 56 remains in the fracture 18 and can function to prop open the fracture, reduce production of formation fines, etc., with increased fluid communicability between the formation 14 and the wellbore 16.

It may now be fully appreciated that the above disclosure provides significant advancements to the art of producing materials for use in well operations. In examples described above, the material 26 can be manufactured on site, even while a well operation is being performed, and parameters/properties of the material can be changed as needed or desired as the operation progresses.

The above disclosure provides to the art a unique method. In one example, the method can comprise: manufacturing particulate material 26 during an operation at a well 10; injecting the particulate material 26 into the well 10 during the manufacturing step; and changing a dimension of the particulate material 26 during the injecting step.

The manufacturing step can include extruding the material 26 during the operation. The extruding step can include extruding the material 26 so that the material has a desired shape.

The changing step can include increasing the dimension of the particulate material 26 during the injecting step.

The manufacturing step can include fixing a shape of the particulate material 26 by cooling the particulate material 26 prior to the injecting step.

The manufacturing step can include converting a liquid and/or a powder to the particulate material 26.

The method can include changing a density of the particulate material 26 during the injecting step.

The manufacturing step can include combining a polyester with a filler material at the well 10.

The method can include the particulate material 26 degrading in a fracture 18 formed in an earth formation 14.

The injecting step can include alternately injecting the particulate material 26 and a proppant 56.

The injecting step can include simultaneously injecting the particulate material 26 and a proppant 56.

Another method described above can comprise: manufacturing particulate material 26 during an operation at a well 10; injecting the particulate material 26 and a proppant 56 into the well 10 during the manufacturing step; and the particulate material 26 degrading in a fracture 18 formed in an earth formation 14.

Another method described above can comprise: manufacturing particulate material 26 during an operation at a well 10; fixing a shape of the particulate material 26 by cooling the particulate material; and then injecting the particulate material 26 into the well 10.

A particulate material 26 production and injection system 24 for use with a well 10 is also described above. In one example, the system 24 comprises an extruder 28, and a pump 48 connected between the extruder and the well 10. The pump 48 pumps the particulate material 26 into the well 10.

Water 46 can contact the particulate material 26 upstream of the pump 48. The water 46 may fix a dimension and shape of the particulate material 26.

The extruder 28 can receive a filler material 40 therein, and a feed rate of the filler material 40 into the extruder 28 may change while the pump 48 pumps the particulate material 26 into the well 10.

The extruder 28 may receive a gas 42 therein, and a feed rate of the gas 42 into the extruder 28 may change while the pump 48 pumps the particulate material 26 into the well 10.

A gap between screws 30 of the extruder 28 may change while the pump 48 pumps the particulate material 26 into the well 10.

The system 24 may include a die 32 connected at an output of the extruder 28. An opening through the die 32 may change while the pump 48 pumps the particulate material 26 into the well 10.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method, comprising:
   manufacturing a particulate material via an extruder fluidly coupled to a well during an operation at the well, wherein the extruder comprises two parallel screws,
      wherein the step of manufacturing the particulate material comprises, (i) manufacturing a first portion of the particulate material, the first portion having a first dimension, and (ii) while the extruder is in operation, adjusting a gap between the two parallel screws and thereby manufacturing a second portion of the particulate material, the second portion having a second dimension,
      wherein the first dimension and the second dimension are different; and
   injecting the particulate material into the well.

2. The method of claim 1, wherein the step of manufacturing the particulate material further comprises extruding a material during the operation.

3. The method of claim 2, wherein the step of extruding the material during the operation comprises extruding the material so that the material has a desired shape.

4. The method of claim 1, wherein the second dimension is larger than the first dimension.

5. The method of claim 1, wherein the step of manufacturing the particulate material further comprises fixing a shape of the particulate material by cooling the particulate material.

6. The method of claim 1, wherein the step of manufacturing the particulate material further comprises converting at least one of a liquid or a powder to the particulate material.

7. The method of claim 1, wherein the second portion of the particulate material has a density different than that of the first portion of the particulate material.

8. The method of claim 1, wherein the step of manufacturing the particulate material further comprises combining a polyester with a filler material at the well.

9. The method of claim 1, further comprising the particulate material degrading in a fracture formed in an earth formation.

10. The method of claim 1, wherein the step of injecting further comprises a selected one of the group consisting of: a) alternately injecting the particulate material and a proppant, and b) simultaneously injecting the particulate material and a proppant.

11. A method, comprising:
manufacturing a particulate material via an extruder fluidly coupled to a well during an operation at the well, wherein the extruder comprises two parallel screws, wherein the step of manufacturing the particulate material comprises, (i) manufacturing a first portion of the particulate material, the first portion having a first dimension, and (ii) while the extruder is in operation, adjusting a gap between the two parallel screws and thereby manufacturing a second portion of the particulate material, the second portion having a second dimension,
wherein the first dimension and the second dimension are different; and
fixing a shape of the particulate material by cooling the particulate material; and
injecting the particulate material into the well.

12. The method of claim 11, wherein the injecting further comprises alternately injecting the particulate material and a proppant.

13. The method of claim 11, wherein the injecting further comprises simultaneously injecting the particulate material and a proppant.

14. The method of claim 11, wherein adjusting the gap between the two parallel screws while the extruder is in operation further occurs during the injecting.

15. The method of claim 14, wherein the second dimension is larger than the first dimension.

16. The method of claim 11, wherein the step of manufacturing the particulate material further comprises extruding a material during the operation.

17. The method of claim 11, further comprising the particulate material degrading in the well.

18. The method of claim 11, wherein the step of manufacturing the particulate material further comprises converting at least one of a liquid or a powder to the particulate material.

19. The method of claim 11, the second portion of the particulate material has a density different than that of the first portion of the particulate material.

20. The method of claim 11, wherein the step of manufacturing the particulate material further comprises combining a polyester with a filler material at the well.

* * * * *